(12) United States Patent
Zhou et al.

(10) Patent No.: US 9,195,871 B2
(45) Date of Patent: Nov. 24, 2015

(54) INFORMATION PROCESSING METHOD AND SYSTEM

(71) Applicant: Alibaba Group Holding Limited, George Town (KY)

(72) Inventors: Shiqi Zhou, Beijing (CN); Rufeng Chu, Beijing (CN); Lun Zhang, Beijing (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 14/172,654

(22) Filed: Feb. 4, 2014

(65) Prior Publication Data

US 2014/0217178 A1    Aug. 7, 2014

(30) Foreign Application Priority Data

Feb. 6, 2013    (CN) .......................... 2013 1 0047346

(51) Int. Cl.
*G06K 7/10* (2006.01)
*G06K 7/14* (2006.01)
*G06F 3/01* (2006.01)
(Continued)

(52) U.S. Cl.
CPC .............. *G06K 7/1417* (2013.01); *G06F 3/017* (2013.01); *G06F 3/0317* (2013.01); *G06K 7/1443* (2013.01); *G06K 7/1456* (2013.01); *G06T 7/0044* (2013.01); *G06F 2200/1637* (2013.01);
(Continued)

(58) Field of Classification Search
CPC . G06K 7/14; G06K 7/10722; G06K 7/10851; G06K 9/06028
USPC ................................ 235/454, 462.08, 462.11

IPC ............. G06K 7/14,7/10722, 7/10851, 9/06028
See application file for complete search history.

(56) References Cited

U.S. PATENT DOCUMENTS

| 5,802,179 A | 9/1998 | Yamamoto |
| 2002/0128857 A1 | 9/2002 | Lee |

(Continued)

FOREIGN PATENT DOCUMENTS

| CN | 101339654 | 1/2009 |
| CN | 102254345 | 11/2011 |

OTHER PUBLICATIONS

Rekimoto et al. "CyberCode: designing augmented reality environments with visual tags." Proceedings of DARE 2000 on Designing augmented reality environments. ACM, 2000.
(Continued)

*Primary Examiner* — Karl D Frech
(74) *Attorney, Agent, or Firm* — Van Pelt, Yi & James LLP

(57) ABSTRACT

An identification code-based three-dimensional interactive technique includes acquiring an image including an identification-coded real object, the image being taken by video-capable equipment, identifying an identification code from the identification-coded real object, obtaining object information corresponding to the identification code, acquiring a reference image associated with the identification code and feature points of the reference image, obtaining a position, an orientation, or a combination thereof on the video-capable equipment relative to the identification-coded real object based on the reference image and the feature points of the reference image, and conducting a three-dimensional interaction based on the position, the orientation, or a combination thereof of the video-capable equipment relative to the identification-coded real object and the object information corresponding to the identification code.

28 Claims, 27 Drawing Sheets

(51) Int. Cl.
*G06F 3/03* (2006.01)
*G06T 7/00* (2006.01)

(52) U.S. Cl.
CPC ............... *G06T 2207/10016* (2013.01); *G06T 2207/30208* (2013.01)

(56) References Cited

U.S. PATENT DOCUMENTS

| | | |
|---|---|---|
| 2004/0028258 A1 | 2/2004 | Naimark et al. |
| 2004/0041028 A1* | 3/2004 | Smith et al. ............... 235/462.01 |
| 2005/0216277 A1 | 9/2005 | Lee |
| 2010/0020970 A1* | 1/2010 | Liu et al. ........................ 380/255 |
| 2012/0327117 A1 | 12/2012 | Weller et al. |
| 2013/0068839 A1* | 3/2013 | Drzymala et al. ............. 235/454 |
| 2014/0210857 A1* | 7/2014 | Liu et al. ........................ 345/633 |

OTHER PUBLICATIONS

Lai et al. "Mobile edutainment with interactive augmented reality using adaptive marker tracking." 2012 IEEE 18th International Conference on Parallel and Distributed Systems (ICPADS), Dec. 17, 2012, pp. 124-131.

Kato, Hirokazu, and Mark Billinghurst. "Marker tracking and hmd calibration for a video-based augmented reality conferencing system." Augmented Reality, 1999.(IWAR'99) Proceedings. 2nd IEEE and ACM International Workshop on. IEEE, 1999.

Prince et al. "Augmented reality camera tracking with homographies." Computer Graphics and Applications, IEEE 22.6 (2002): 39-45.

David Kriegman. "Nomography Estimation." Lecture Computer Vision I, CSE A 252 (2007).

* cited by examiner

Reference Image

Current Image

Frame Obtained by Camera

800

900

INFORMATION PROCESSING METHOD AND SYSTEM

CROSS REFERENCE TO OTHER APPLICATIONS

This application claims priority to People's Republic of China Patent Application No. 201310047346.2 entitled AN IDENTIFICATION CODE-BASED THREE-DIMENSIONAL INTERACTIVE METHOD AND SYSTEM, filed Feb. 6, 2013 which is incorporated herein by reference for all purposes.

FIELD OF THE INVENTION

The present application relates to an information processing method and system.

BACKGROUND OF THE INVENTION

With a continual increase in interactive experience requirements from users, development of augmented reality applications has greatly increased. One of the most important technologies in augmented reality systems is three-dimensional registration. Three-dimensional registration involves computing transformational relationships between a world coordinate system and a screen coordinate system to thereby compute a position and orientation of a current video-capable equipment and then combining virtual objects with real scenery based on the computed position and orientation of the current video-capable equipment.

Conventional methods for performing three-dimensional registration computations include: 1) Using Scale Invariant Feature Transform (SIFT) and Speed Up Robust Feature (SURF), methods to match feature points from the reference image and the current image obtained from the video-capable equipment. However, this type of method involves a relatively large volume of computations. 2) Using a modeling method such as Random Ferns. These types of modeling methods, however, occupy a relatively large amount of memory.

An example of research being performed on augmented reality registration includes Chinese patent "A marker point-based augmented reality three-dimensional registration method and system" (App. no. 200710011266.6). This method includes projecting marker points which are invisible to the naked eye onto a bearing surface of a real environment. Then, the projected invisible marker points are filmed using a video camera having an invisible light filter. Registration is performed using two-dimensional coordinate data acquired from the invisible marker points on a screen. This method has high hardware requirements.

Another example is Chinese patent application "A cloud computing-based natural feature registration method" (app. no. 201110180881.6). This method first extracts sets of natural feature points for reference images. The natural feature points are extracted from image key frames obtained by image-capturing equipment. Then, positions and angles of the image-capturing equipment are calculated based on the results of cloud computing-based natural feature point matching and then three-dimensional registration is performed. This method utilizes a background server and also has high network communication requirements.

In addition, in an image based three-dimensional human-computer interactions, only a few types of items represented by the pictures can be identified when the equipment's computing capability is limited. An example of a natural picture is a trademark. Otherwise, a network is to be utilized with a background server in order to simultaneously identify a plurality of products.

On the other hand, identification code (such as a two-dimensional code or quick response (QR) code) designs are simple, easy to recognize, and standardized. The identification code designs can correspond to a plurality of products. Moreover, the identification code designs entail relatively simple calculations, which can be more easily performed on cell phones and other mobile equipment. In applying a traditional identification code, such as a two-dimensional code, to a cell phone or other mobile equipment, a user scans the two-dimensional code with a cell phone lens or inputs a number or keyword under the two-dimensional code. The user can quickly go online via the cell phone and browse web pages, download images, text, music, and videos, acquire coupons, participate in drawings, and learn about a company's products, all without inputting a uniform resource location (URL) into the cell phone. Thus, one-key Internet access is achieved. In addition, the cell phone can also be used to identify and store business cards, automatically input short messages, acquire public services (such as weather forecasts), and perform electronic map searching and positioning, cell phone reading, and other such functions. Traditional identification code apps only use two-dimensional codes to read certain information. Then the traditional identification code apps use the read information to open additional links, etc.

BRIEF DESCRIPTION OF THE DRAWINGS

Various embodiments of the invention are disclosed in the following detailed description and the accompanying drawings.

The drawings described here are intended to further the understanding of the present application, and form a part of this application. The exemplary embodiments of the present application and the descriptions thereof are intended to explain this application, and do not constitute inappropriate limitation of the present application. Among the drawings.

DETAILED DESCRIPTION

Figure 1A:
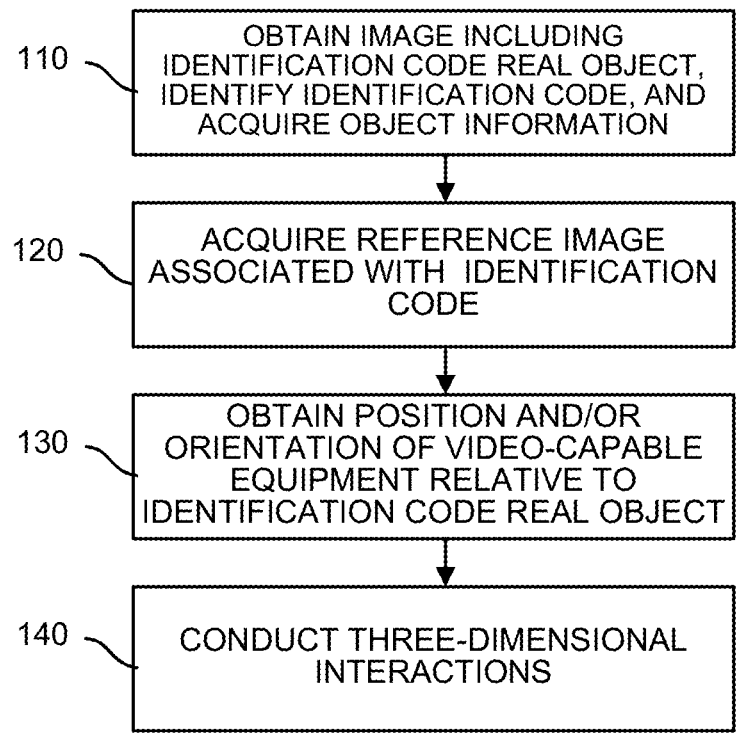
FIG. 1A is a flowchart of an embodiment of an identification code-based three-dimensional interactive process.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present application provides a technique for obtaining, during a three-dimensional interaction process, a predictive homography matrix to obtain a predicted image. The technique applies a predictive homography matrix to feature point matching, obtains a homography matrix of reference image-to-current image, obtains a position and/or orientation of video-capable equipment from a homography matrix of reference image-to-current image, and thereby conducts three-dimensional interactions.

Explanations for the terms used in the present application are provided below.

Three-dimensional interaction refers to obtaining status information on physical objects in a three-dimensional space and interacting with users based on the status information in the three-dimensional space. An example of an interaction includes controlling the distance between a mobile phone and an image to control the displayed 3-D object's size or orientation. The mobile phone changes the relative position and orientation of the image to control movements or other actions in a game to make the game more realistic. The physical objects can include devices or equipment held by users, items designated by users, etc. The status information in the three-dimensional space can include positions in three-dimensional space, orientations in three-dimensional space, etc.

Identification code relates to information stored using images. Examples of identification codes include a barcode and a Quick Response (QR) or QuickMark code. The QR or QuickMark code are a type of 2-dimensional barcode.

Identification-coded real object corresponds to an identification code displayed using a real object. To identify objects that are coded, objects are scanned like products in a supermarket. The goal is to identify objects via the code. Examples of identification-coded real objects include a typed identification code, a printed identification code, an identification code displayed on a display device, etc.

Standard identification code corresponds to an accurate, undistorted identification code generated based on information. The information includes alphanumeric strings, such as www.alibaba-inc.com, a number such as "12197116415," a contact such as "Name: Zhou Shiqi, Company: Alibaba, Phone number: 1234567991," etc.

A reference image corresponds to an image that was used in a three-dimensional interaction. The reference image can be used to describe an initial status or standard status of a photographed object. In other words, the reference image serves as a reference for a current image. Through calculations performed on the reference image and the current image, the current position and orientation of the current video-capable equipment is obtainable. The reference image can be obtained through photography, be based on a standard identification code generated by an identification code-generating algorithm, or the reference image can be obtained by querying a database or a network with an identification code.

Reference image feature points refer to points corresponding to distinct features in a reference image. The reference image feature points can be obtained through a feature point detection algorithm. Examples of feature point detection algorithms include Scale Invariant Feature Transform (SIFT) and Speed Up Robust Feature (SURF). The reference image feature points can include reference vertices. For example, if a reference image is a rectangle, the feature points include the four vertices of the rectangle.

A current image corresponds to a present image that was obtained with video-capable equipment and that includes an identification-coded real object or a reference image real object. The current image can be used to describe the current status of the video-capable equipment relative to the photographed object. The position and orientation of the current video-capable equipment can be obtained through calculations using the current image and the reference image.

Regarding a predicted image, in order to reduce computation volume and increase computation speed, the predicted image is first obtained by calculating a position and orientation of the video-capable equipment based on a reference image and a current image. The predicted image is a simulated forecast image. The predicted image can be obtained based on the reference image and a predictive homography matrix.

In projective geometry, a homography is an isomorphism of projective spaces, induced by an isomorphism of the vector spaces from which they are derived. It is a bijection that maps lines to lines, and thus a collineation.

Regarding the predictive homography matrix, to obtain the predicted image based on a reference image, the system can first obtain a predictive homography matrix. Then, the system obtains the predicted image by applying the predictive homography matrix to the reference image. The predictive homography matrix embodies the calculating of the predicted image. Different predictive homography matrix calculation approaches exist, and are discussed in greater detail below.

In another example, when k=2, $P_k=P_2=H_1^S$. When k>2, $P_k=H_{k-1}^{k-2} \times H_{k-1}^S$, $P_k$ is the predictive homography matrix. $P_k$ is determined based on the homography matrix of the previous frame, $H_{k-1}^S$ and the homography matrix of the (k−1)th to (k−2)th frame $H_{k-1}^{k-2}$. Also when K>2, $P_k=H_{k-1}^S$, which means to use the homography matrix of the previous frame, $H_{k-1}^S$ is the current frame's predictive homography matrix. A class 1 feature point matching algorithm includes Scale Invariant Feature Transform (SIFT), Speed Up Robust Feature (SURF), or other feature point matching algorithms with similar functions.

A class 2 feature point matching algorithm includes template matching, cross correlation, normalized cross correlation, or other feature point matching algorithms with similar functions.

An identification code-based three-dimensional interactive technique is provided. An example of this technique is applied as follows: a user is viewing a product package including an identification code, and the product package includes a product. The user takes out their cell phone (an example of video-capable equipment), activates on the cell phone's picture-taking function, and takes an image of the identification code. At this point, the present technique uses the image taken by the cell phone to determine a position and orientation of the phone relative to the product package and adds information (e.g., a three-dimensional image) on the product identified based on the identification code to the position of the product package in the phone's current image, thus enhancing the user's experience. The method is further described below.

FIG. 1A is a flowchart of an embodiment of an identification code-based three-dimensional interactive process. In some embodiments, the process 100 is performed by a client 920 of FIG. 9 and includes:

In some embodiments, the client communicates with the server, such as, for example, to transfer images obtained by a camera on the client side to the server side, and then the server completes all the computation. However, this relies on the network. In some embodiments, the computations take place at the client.

In 110, the server obtains an image including an identification-coded real object and taken by video-capable equipment, identifies an identification code from the identification-coded real object, and acquires object information corresponding to the identified identification code. The object information includes basic information (e.g., object ID) obtained using the identification code. In some embodiments, the identification code is a bar code or a 2D bar code, which has other information, and the object ID is one type of other information. In some embodiments, the object information also includes target data obtained from a local database or a network based on the basic information. The target information can include a great deal of information. For example, target information includes a list of ingredients of the product, product specification, or a link to a website for promotional purposes. In some embodiments, the target data includes a three-dimensional image corresponding to the object information. Examples of the target data include JPEG, TIF, etc. For example, the video-capable equipment can be a video camera, mobile equipment having an image capturing function, portable equipment with an image capturing function, etc. The identification-coded real object is captured using the video-capable equipment. Thus, the image including the identification-coded real object is obtained. This identification code is identified (e.g., looked up in a database) to obtain the object information included in the identification code.

In 120, the server acquires a reference image associated with the identification code and feature points of the reference image.

In some embodiments, data associated with identification codes is stored in a database. The data can include object IDs corresponding to the identification codes, reference images associated with the identification codes, feature points of these reference images, and other such content.

Figure 1B:
FIG. 1B is a diagram of an example of a reference image and a current image.
Figure 1B:

In some embodiments, the server queries the database using an object ID obtained by the identifying of the identification code. In the event that the database has a reference image associated with the identification code and the feature points of the reference image, the server acquires the reference image. FIG. 1B is a diagram of an example of a reference image and a current image. In the event that the database does not have a reference image associated with the identification code and the feature points of the reference image, the server obtains a reference image associated with the identification code. An example of the obtaining of the reference image is provided in operation 210 of FIG. 2A. Moreover, the server obtains the reference image feature points and stores the reference image feature points in the database. An example of the obtaining of the reference image feature points is provided in operation 220 of FIG. 2A.

Figure 1C:
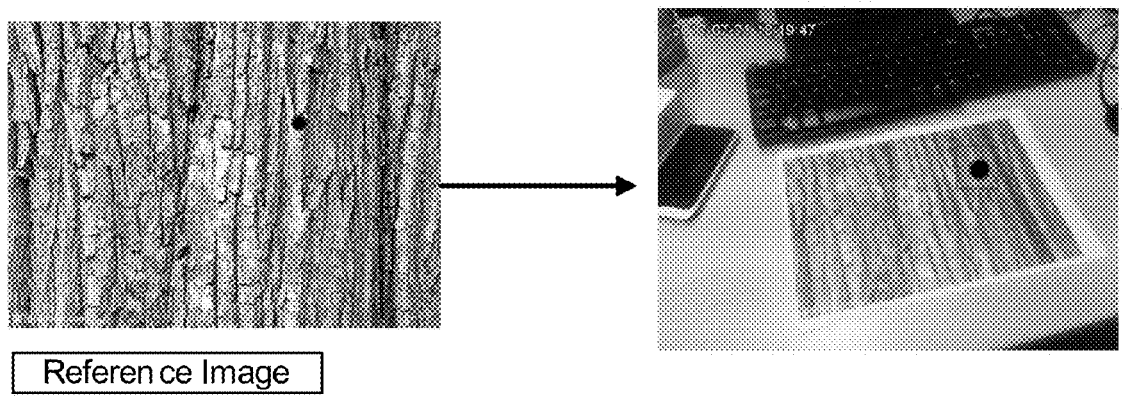
FIG. 1C is a diagram of an example of a reference image and a current image including a black spot.

Referring back to FIG. 1A, in 130, the server obtains a position and/or orientation of the video-capable equipment relative to the identification-coded real object based on the reference image and the features points of the reference image. FIG. 1C is a diagram of an example of a reference image and a current image including a black spot. Using the black spot in the reference image of FIG. 1C as a feature point, the black spot is found in the current image frame using a matching algorithm. Then, a homography matrix is used to compute the relative position of the image capturing equipment with respect to the printed image's position and orientation.

Referring back to FIG. 1A, in 140, the server conducts three-dimensional interactions based on the position and/or orientation of the video-capable equipment relative to the identification-coded real object and the object information corresponding to the identification code. An example of a three-dimensional interaction includes a person holding a card, and a flying iron man in a video game is controlled by moving the card around. In order to control the flying iron man, a video camera on a side of the television locates the card, and computes, in real time, relative position, orientation, and movement of the card relative to the video camera, and uses the computed position, orientation, and movement to control the flying iron man. After the obtaining of the position and/or orientation of the video-capable equipment relative to the identification-coded real object, the user, for example, adds object information (e.g., the three-dimensional image of the object) to the identification code-containing image in order to attain a virtual-real composite effect of the object information located at the position of the identification-coded real object and thus be able to interact in a three-dimensional manner. In some embodiments, in order to add object information, a program identifies a target ID, sets up target information, and provides a button in the program, where the user can activate the button and show the information on the display.

In some embodiments, in operation 130, the server continuously obtains the position and/or orientation of the video-capable equipment relative to the identification-coded real object, and then, in operation 140, the server obtains a relative motion speed, acceleration, or a combination thereof of the video-capable equipment and the identification code or the real object where the identification code is located, and transmits the relative motion speed, acceleration, or a combination thereof of the video-capable equipment and the identification code or the real object where the identification code is located in a predetermined manner to a user interface. For example, the predetermined manner is via a data display, a three-dimensional image display, or symbols (such as arrows or bar charts). As discussed, moving the card relative to the video camera allows control of the flying iron man in the video game.

Figure 2A:
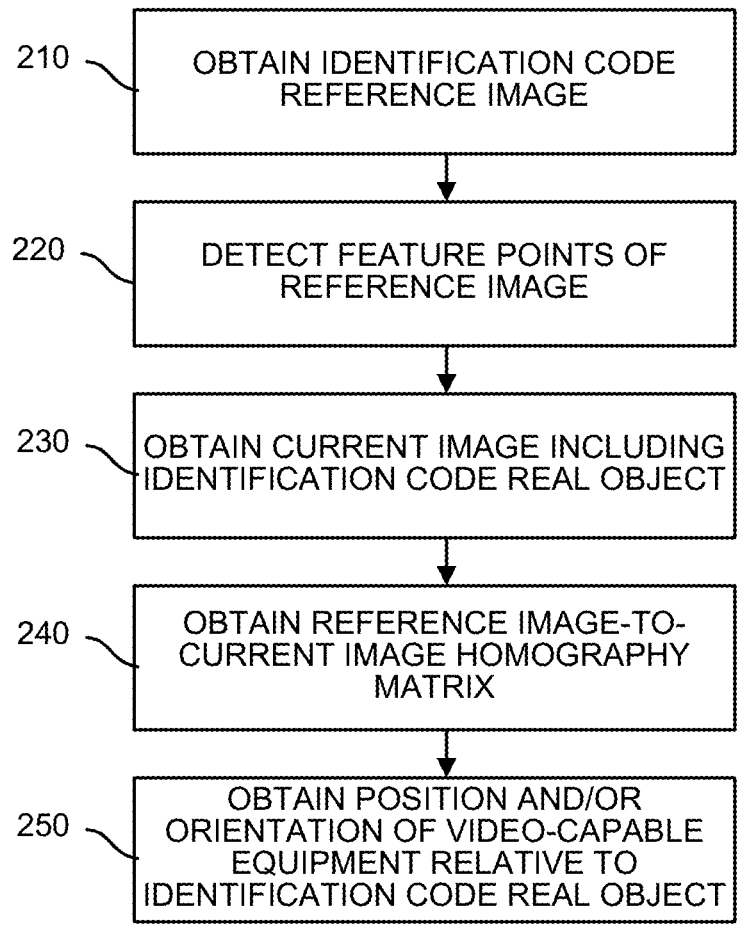
FIG. 2A is a flowchart of an embodiment of a process for obtaining a position and/or orientation of video-capable equipment relative to an identification-coded real object.
Figure 2B:
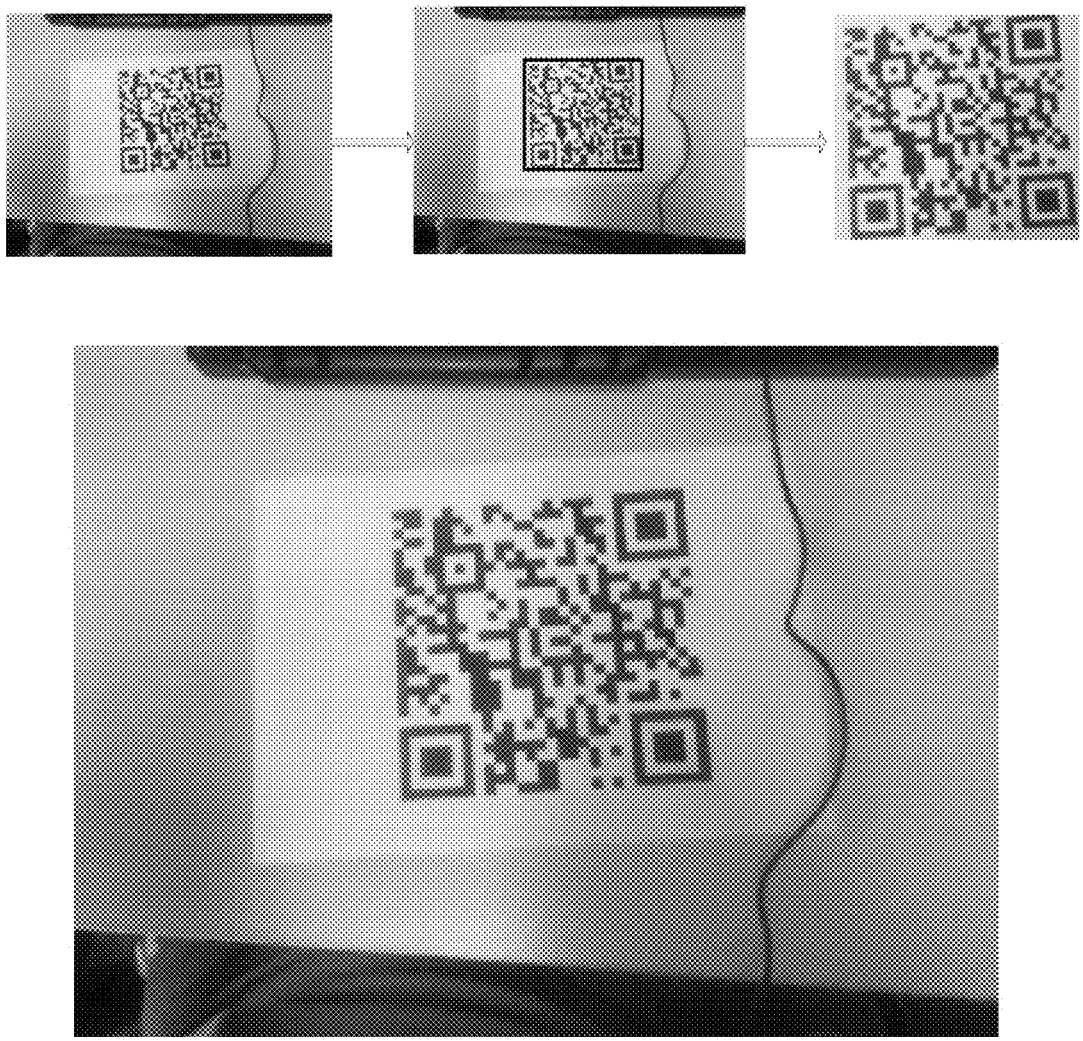
FIG. 2B is a diagram of an example of a 2D code.
Figure 2C:
FIG. 2C is a diagram of an example of a standard identification code image.

FIG. 2A is a flowchart of an embodiment of a process for obtaining a position and/or orientation of video-capable equipment relative to an identification-coded real object. In some embodiments, the process 200 is performed by a client 920 of FIG. 9 and includes:

In 210, the server obtains an identification code reference image based on the obtained identification-coded real object of the image. In some embodiments, the reference image corresponds to the image including the identification-coded real object. FIG. 2B is a diagram of an example of a 2D code. In the example of FIG. 2B, the 2D code that is extracted from the image is used as a reference image, even though the 2D code is not very clear and is rotated. In some embodiments, the reference image corresponds to a standard identification code image generated based on the image of the identification-coded real object. FIG. 2C is a diagram of an example of a standard identification code image. For example, a 2D code is generated based on a 2D code generation algorithm. Such a 2D code can be stored and used as the standard identification code image because there is no rotation, etc.

As an example, the image including the identification-coded real object is obtained from the image captured by the video-capable equipment, and the object information corresponding to the identification code is identified. Examples of object information include product type, price, place of manufacture, web links etc. Subsequently, a standard identification code image is generated based on the object information and in accordance with an identification code generating algorithm, and the standard identification code image serves as the reference image. An example of the identification code generating algorithm includes a "PDF417" code generation algorithm. After the reference image is acquired, the reference image is stored in a storage device. In some embodiments, the server obtains size information on the reference image, position information on the reference image, color value information on the reference image, and other information on selected points in the reference image.

Referring back to FIG. 2A, in 220, the server detects feature points of the reference image. For example, the server detects a plurality of feature points in the reference image, and records coordinate positions of these feature points in the reference image. In some embodiments, the feature points include vertices of the reference image. As an example, when the reference image corresponds to a standard identification code generated from object information and the standard identification code is a rectangle, the 4 vertices of the standard identification code are obtained as soon as the standard identification code is generated, and the four vertices serve as the positions of the feature points. Note that the matrix calculations utilize at least 4 point pairs. Therefore, if only the vertices are used to perform matrix calculations, the standard identification code should have at least 4 vertices. In another example, the standard identification code should not be triangular because performing matrix calculations with only its 3 vertices is not possible.

Hereafter, the image used to generate the reference image serves as a first frame image.

In 230, the server obtains the current image including the identification-coded real object. The current image is taken by video-capable equipment.

In 240, the server obtains a homography matrix of reference image-to-current image based on reference image and the current image. How to acquire a homography matrix that relates a reference image to a current image (also referred to as a homography matrix of reference image-to-current image) is discussed in FIGS. 3 and 4A.

In 250, the server obtains a position and/or orientation of the video-capable equipment relative to the identification-coded real object based on the homography matrix of reference image-to-current image.

Figure 3:
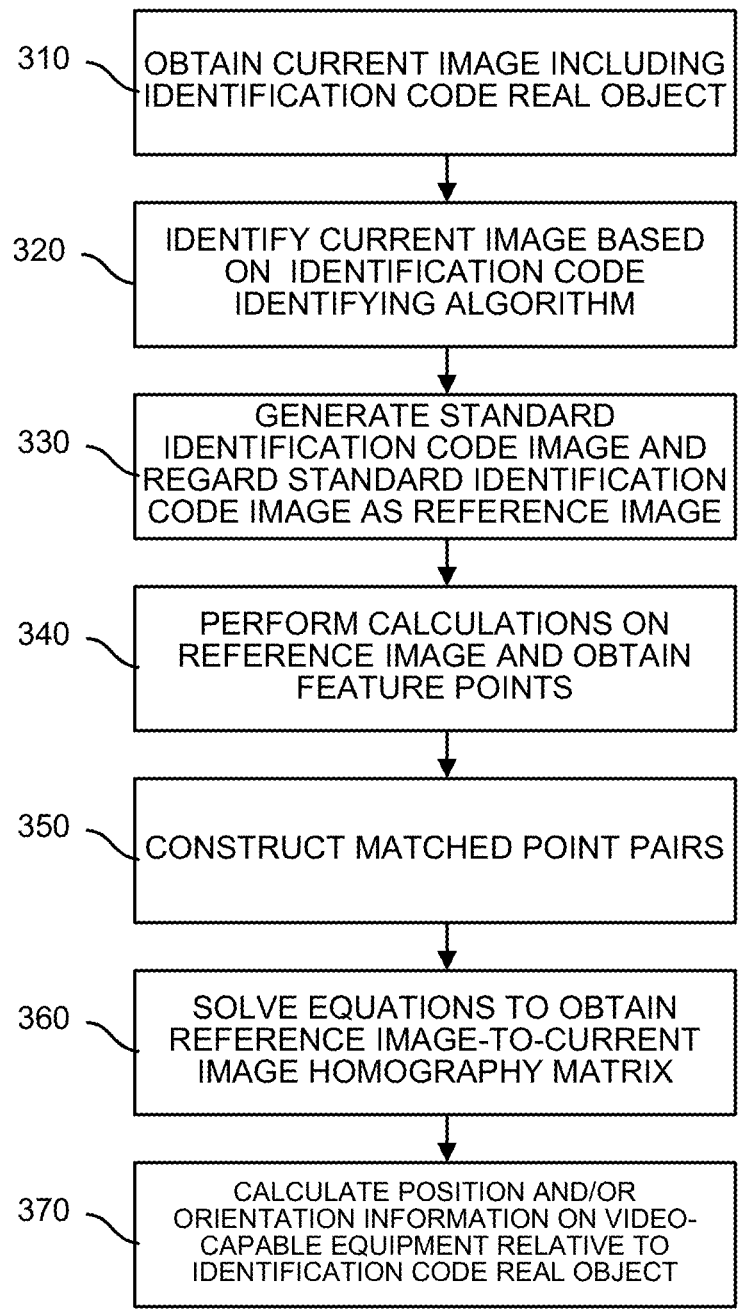
FIGS. 3 and 4A are flowcharts of examples of processes for acquiring a homography matrix of reference image-to-current image.
Figure 4A:
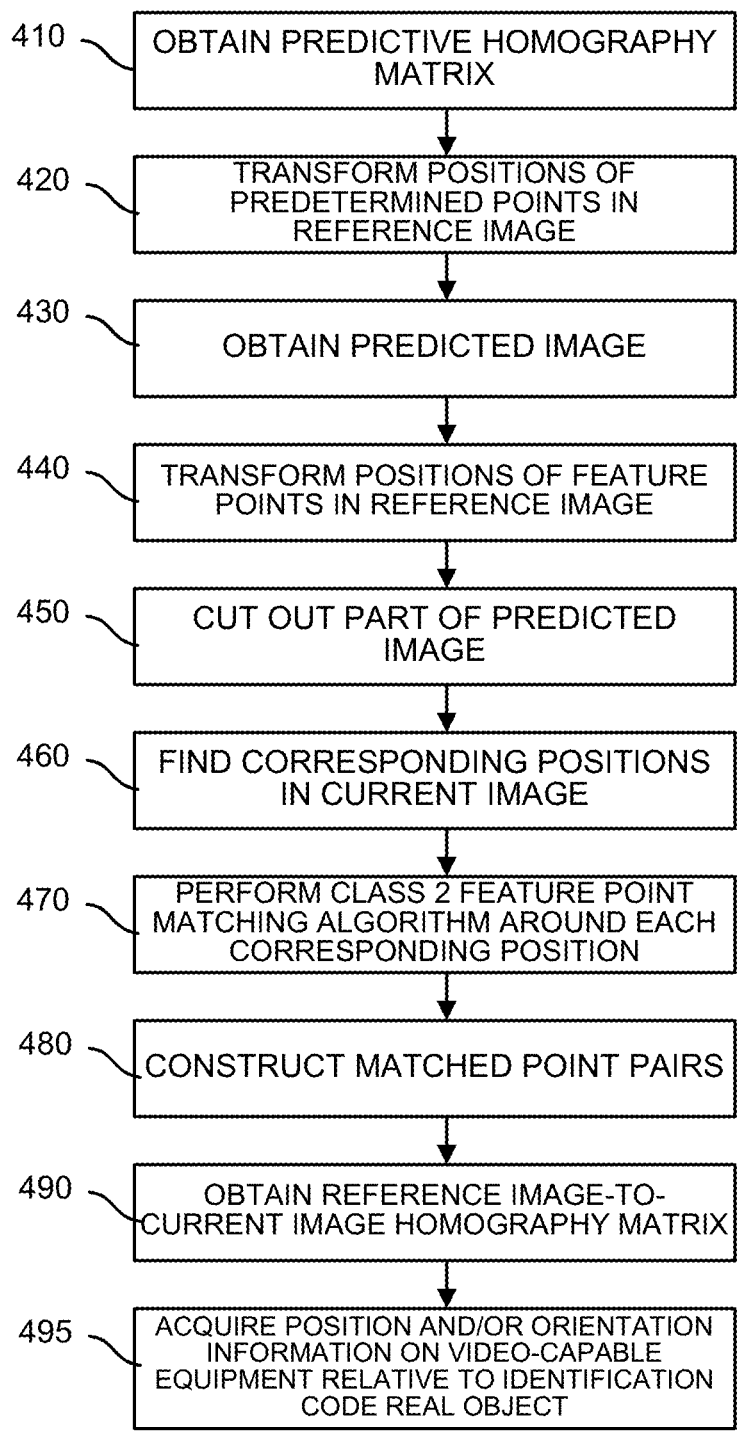

FIGS. 3 and 4A are flowcharts of examples of processes for acquiring a homography matrix of reference image-to-current image. In some embodiments, processes 300 and 400 are performed by a client 920 of FIG. 9 and includes:

The descriptions of FIGS. 3 and 4A include operations that are similar with respect to the descriptions of FIGS. 1 and 2. Details of the similar operations are omitted for conciseness.

In 310, the server obtains a current image including the identification-coded real object, the current image being captured using video-capable equipment and the identification-coded real object including an identification code. In some embodiments, the server identifies frames of the current image that includes the identification code. The frame in the current image including the identification code that appears for the first time is frame 1. The frame in the current image including the identification code that appears for the k-th time is frame k.

When k=1, in FIG. 3, the server performs the following to obtain the homography matrix of reference image-to-current image (k=1).

In 320, the server identifies the current image based on an identification code identifying algorithm, and obtains a position of the identification code in the current image and positions of at least four vertices of the identification code. Note that because the matrix calculations, in 360, use at least 4 point pair positions, the identification code in 320, is to have at least 4 vertices.

In 330, the server generates a standard identification code image using an identification code generating algorithm, the standard identification code image being generated based on the obtained object information, and regards the standard identification code image as a reference image. At the same time, the server obtains the four vertex positions of the standard identification code image.

In 340, the server obtains feature points (other than the 4 vertices) from the reference image and the positions of these feature points based on a feature point detection algorithm. Examples of the feature point detection algorithm include FAST (Features from Accelerated Segment Test) or a Harris (Harris Corner Detector) corner detection method. Typically, more than one feature points are obtained. For example, 6 feature points are obtained. In 440 of FIG. 4A, the obtained feature points are used in a transformation of the position of the feature points.

In 350, the server constructs matched point pairs based on the four identification code vertices in the reference image and the four identification code vertices in the current image. For example, the matched point pairs are the coordinates of the four vertices, e.g., in two images, two points on the upper left hand corners form a matched point pair, e.g., (x1, y1) and (x2, y2)

In 360, the server builds equations based on the matched point pairs and solves the built equations to obtain the homography matrix of reference image-to-current image. The equations for estimating the homography matrix are understood by one of ordinary in the art and are omitted for conciseness.

In 370, the server calculates the position and/or orientation information on the video-capable equipment relative to the identification-coded real object based on the homography matrix of reference image-to-current image.

Figure 4B:
FIG. 4B is a diagram of an example of a reference image including feature points.

When k>1, refer to FIG. 4A, the server obtains a homography matrix of reference image-to-current image (k>1) based on the following process 400. Process 400 includes:

FIG. 4B is a diagram of an example of a reference image including feature points. In the following example, the points of FIG. 4B, which correspond to the dots, are removed from a reference image. The points correspond to the feature points.

Referring back to FIG. 4A, in 410, the server obtains a predictive homography matrix.

Figure 4C:
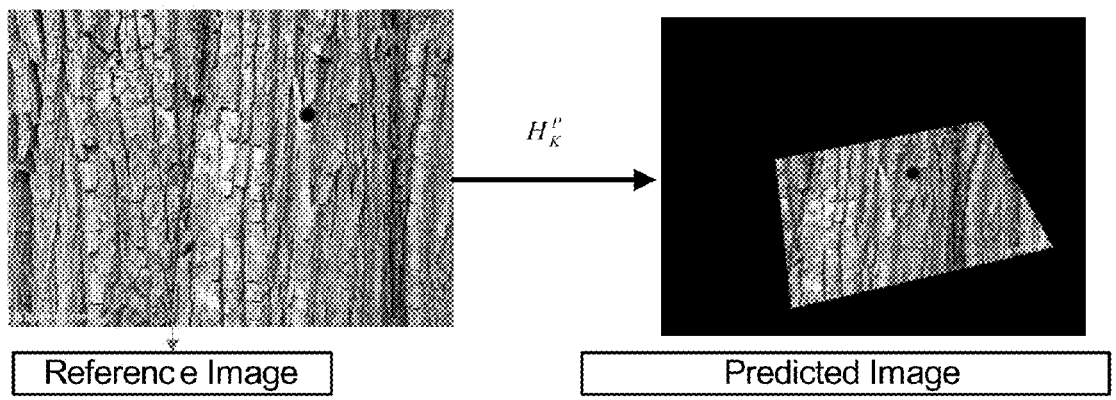
FIG. 4C is a diagram of an example of a reference image, a predicted image, and a current image.
Figure 4C:
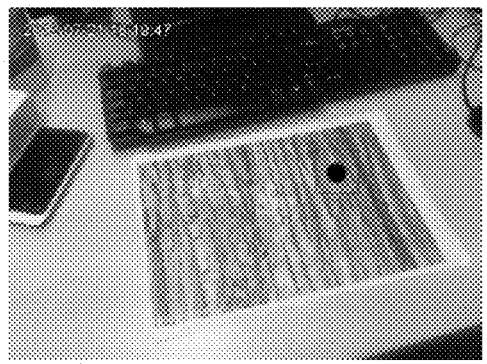

Before obtaining the homography matrix of reference image-to-current image, the server obtains a predicted image. The predicted image corresponds with a forecast image. The forecast image predicts a possible arrangement of the reference image in the image that is captured by the camera. The predicted image is used to more accurately compute the matched points. FIG. 4C is a diagram of an example of a reference image, a predicted image, and a current image. In the example of FIG. 4C, the reference image and the image captured by the camera are changed in shape and rotated, and there is a large difference between the image, so computing the black dot's corresponding matching point can lead to errors. However, the predicted image and the image captured by the camera have a smaller difference.

The server performs reference image feature point matching point calculations based on the predicted image. The performance of the reference image feature point matching point calculations based on the predicted image reduces computation volume and increases computation speed. In order to obtain the predicted image, the server obtains the predictive homography matrix. In some embodiments, the server is capable of obtaining the predictive homography matrix based on different combinations of hardware operations and calculation rules. In some embodiments, the calculation is as follows:

when k=2, $P_k=P_2=H_1^S$;
when k>2, $P_k=H_{k-1}^{k-2} \times H_{k-1}^S$, $P_k$ is the predictive homography matrix of the k-th frame.

wherein $H_{k-1}^{k-2}=H_{k-1}^S \times (H_{k-2}^S)^{-1}$; wherein $H_{k-1}^{k-2}$ indicates the homography matrix of the (k-2)th frame image to the (k-1)th frame image; $H_{k-1}^S$ indicates homography matrix of the reference image S to the (k-1)th frame image. (This homography matrix can be obtained with reference to FIG. 3.)

Figure 4D:
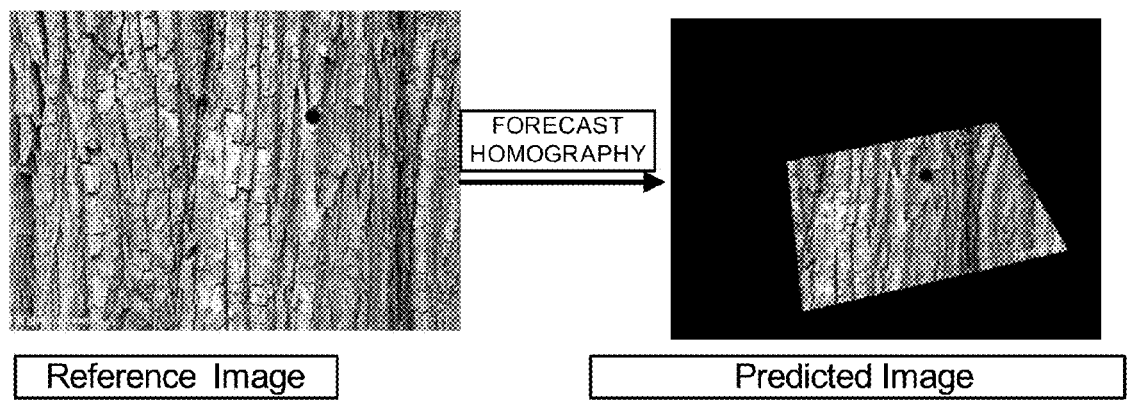
FIG. 4D is a diagram of an example of a reference image and a predicted image.

In 420, the server transforms positions of predetermined points in the reference image based on the predictive homography matrix, and obtains predicted positions of the reference image predetermined points in the predicted image based on the transformed positions. FIG. 4D is a diagram of an example of a reference image and a predicted image.

Assuming that the predictive homography matrix is $$\begin{pmatrix} a & b & c \\ d & e & f \\ g & h & i \end{pmatrix},$$

the coordinates of the black dot in the reference image is $(x_1, y_1)$, and pixel values are (27, 58, 68), the $$\begin{pmatrix} a & b & c \\ d & e & f \\ g & h & i \end{pmatrix} \begin{pmatrix} x_1 \\ y_1 \\ 1 \end{pmatrix} = \begin{pmatrix} x_2 \\ y_2 \\ 1 \end{pmatrix} \qquad \text{equation}$$

can be used to compute the position of a matching point $(x_2, y_2)$, and assign the pixel values to $(x_2, y_2)$ in the reference image. Accordingly, the pixel values of the reference image are computed. Typically, the predetermined points are all the points in the reference image. In other words, the server obtains the positions of all the reference image points in the predicted image. In some embodiments, the predetermined points are some of the points in the reference image.

Referring back to FIG. 4A, in 430, the server obtains a predicted image based on the positions of the predetermined points and the corresponding color values of the predetermined points in the reference image.

In 440, the server transforms the positions of the feature points in the reference image and obtains predicted positions of the reference image feature points in the predicted image. For example, the server transforms positions of 6 feature points in the reference image, and obtains 6 predicted positions of the 6 feature points in the predicted image.

In 450, the server cuts out a part of the predicted image based on a predetermined size and shape around the predicted position of each of the reference image feature points in the predicted image and has the part serve as a predetermined image block corresponding to each feature point. For example, 6 predicted positions of reference image feature points in the predicted image that have already been obtained exist. Thus, for each predicted position, the server cuts out from the predicted image a square (shape) whose center is the predicted position and that has a predetermined size of 9×9 pixels. In other words, the server obtains 6 image blocks with each image block being 9×9 pixels.

In 460, the server finds corresponding positions in the current image based on the predicted positions of the feature points in the predicted image. For example, 6 corresponding positions are found in the current image with respect to the 6 predicted positions of the 6 feature points in the predicted image that have already been obtained.

Figure 4E:
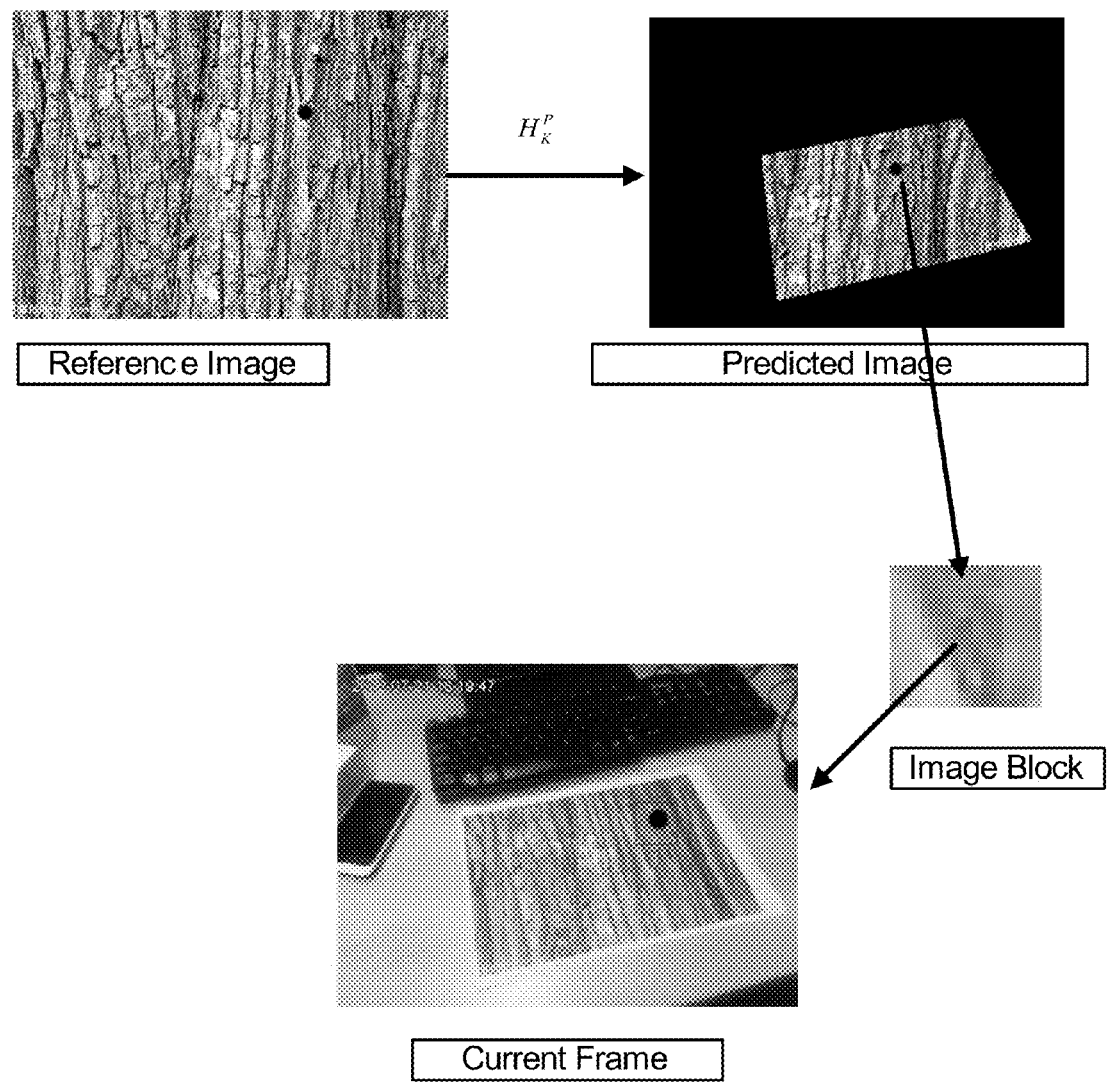
FIG. 4E is a diagram of an example of a reference image, a predicted image, an image block, and a current image.

In 470, the server obtains matched points for the reference image feature points in the current image using a class 2 feature point matching algorithm around each corresponding position in the current image, and within a preset range. The class 2 feature point matching algorithm uses the corresponding image block as a standard to obtain the matched points. FIG. 4E is a diagram of an example of a reference image, a predicted image, an image block, and a current image. For example, the image block is used to obtain a matching point. This obtaining of the matching point includes the reference image being transformed by the homography matrix to form a predicted image. A feature point (e.g., the black dot) has a coordinate A, and a homography transformation is performed to obtain a corresponding point B. In the current frame, there is also a location B, and a 3×3 image block having a location B as its center is selected. Based on position B being the center of the current frame, an additional point C (e.g., in each of the 9 points in the 3×3 image block) is selected, and location C is selected as the center to select the same 3×3 image to and apply the same technique to obtain many image blocks to find the best matching point for the predicted image's position A and the current frame image. Examples of the image block techniques described above include SIFT, SURF, Binary Robust Invariant Scalable Keypoints (BRISK), etc. Examples of the class 2 feature point matching algorithm include template matching, cross correlation, normalized cross correlation, or other feature point matching algorithm with a similar function. For example, 6 corresponding positions are found in the current image. For one of the obtained 6 corresponding positions, the corresponding 9×9 pixel image block is used within a preset 15×15 pixel range around the position, and the class 2 feature point matching algorithm is used to find 1 matched point. In other words, one position of a matched point is obtained in the current image. The remaining 5 matched points and their 5 positions in the current image are also found using the class 2 feature point matching algorithm and the corresponding matched blocks.

Referring back to FIG. 4A, in 480, the server constructs matched point pairs based on the feature points of the reference image and the matched points in the current image. For example: 6 feature point positions are obtained from 340 of FIG. 3. The position of one of the feature points in the reference image is (3,9). 6 matched point positions are obtained from 470 of FIG. 4A. The position in the current image of the matched point corresponding to the above feature point is (2,8). Thus, [(3,9); (2,8)] corresponds with one matched point pair. The remaining 5 matched point pairs are obtained in a similar manner for a total of 6 matched point pairs. In some embodiments, after the above matched point pairs are obtained, erroneous point pairs are eliminated using a Prosac (Progressive Sample Consensus) algorithm or a Ransac (Random Sample Consensus) algorithm. For example, 6 matched point pairs have already been obtained, and an erroneous matched point pair is eliminated using the Prosac or Ransac algorithm, so that 5 matched point pairs remain.

In 490, the server obtains a homography matrix of reference image-to-current image based on the matched point pairs. In some embodiments, a singular value decomposition algorithm, a LM iterative optimization algorithm (Levenberg-Marquardt method) or a Gauss-Newton algorithm is used to calculate the homography matrix of reference image-to-current image based on the matched point pairs.

In 495, the server acquires a position and/or orientation information on the video-capable equipment relative to the identification-coded real object based on the homography matrix of reference image-to-current image.

Figure 5A:
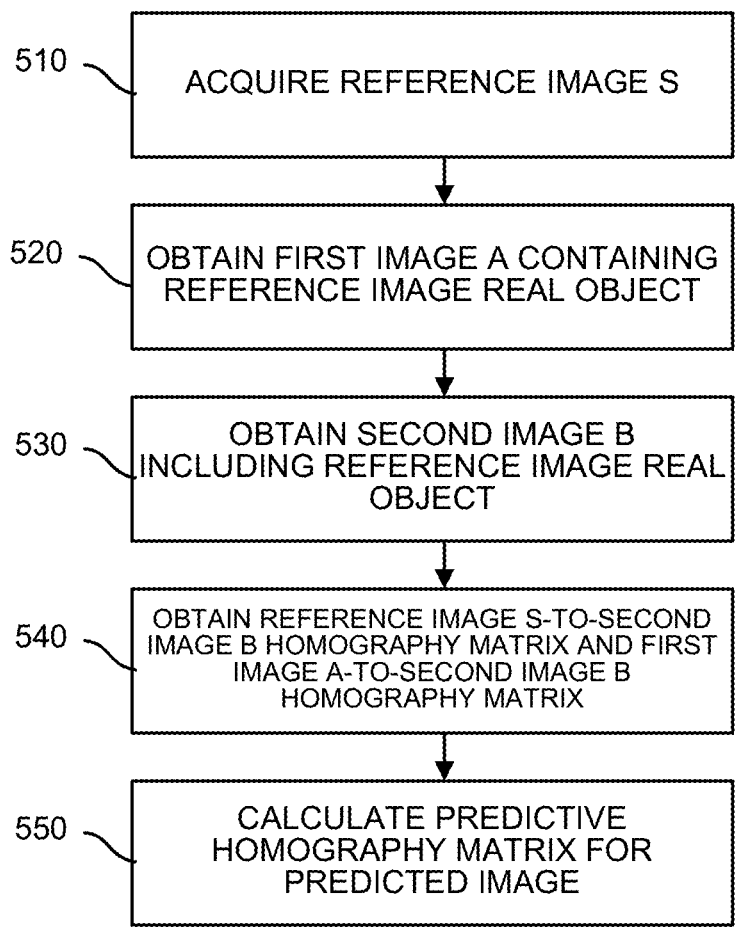
FIG. 5A is a flowchart of an embodiment of a process for obtaining a predictive homography matrix.
Figure 5B:
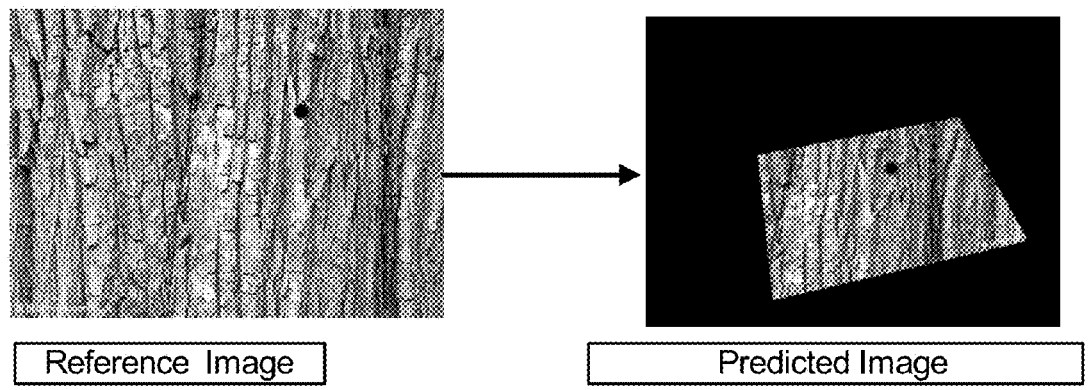
FIG. 5B is a diagram of another example of a reference image, a predicted image, and a current image.
Figure 5B:
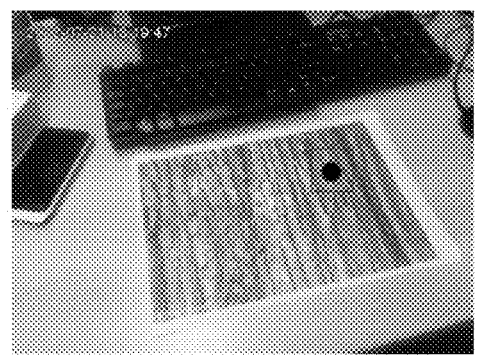

FIG. 5A is a flowchart of an embodiment of a process for obtaining a predictive homography matrix. In some embodiments, the process 500 is an implementation of operation 410 and includes:

In 510, the server acquires a reference image S. (All reference images in FIG. 5A refer to this reference image. For convenience, the reference image is marked with a symbol S.) FIG. 5B is a diagram of another example of a reference image, a predicted image, and a current image. In some embodiments, the reference image is pre-stored in equipment, is an image taken by video-capable equipment, or an otherwise acquired image. After the reference image is acquired, the reference image can be stored in a storage device. In some embodiments, size information on the reference image, position information on the reference image, color value information on the reference image, and other such information on selected points in the reference image is obtained.

Figure 5C:
FIG. 5C is a diagram of an example of a reference image real object.

Referring back to FIG. 5A, in 520, the server obtains a first image A that was captured using the video-capable equipment and that contains a reference image real object. An example of the first image A includes a frame obtained by the video-capable equipment that has a reference image. The reference image real object refers to a reference image that exists in a physical form. FIG. 5C is a diagram of an example of a reference image real object. Examples of the reference image that exists in a physical form include a typed reference image or a printed reference image. For example, if the reference image is a photograph taken of a real object (e.g., a teapot), the reference image real object is a printed copy of an image of the teapot. The reference image refers to the image that is stored, and the reference image real object refers to the picture that is printed with the image, or a photograph of the image, or the printed sheet of paper with the picture of the bark.

Referring back to FIG. 5A, in 530, the server obtains a second image B including a reference image real object, the second image B being taken using video-capable equipment. For example, the first and second images A and B are the first and second frames of the images obtained from the video camera that have the reference image.

In 540, the server obtains a homography matrix of reference image S-to-second image B and a homography matrix of first image A-to-second image B based on the reference image S, the first image A, and the second image B. An example of a homography matrix is $$\begin{pmatrix} a & b & c \\ d & e & f \\ g & h & i \end{pmatrix}.$$

In 550, the server calculates the predictive homography matrix for the predicted image based on the homography matrix of the first image A-to-second image B and the homography matrix of reference image S-to-second image B based on $P=H_B^A \times H_B^S$.

Figure 5D:
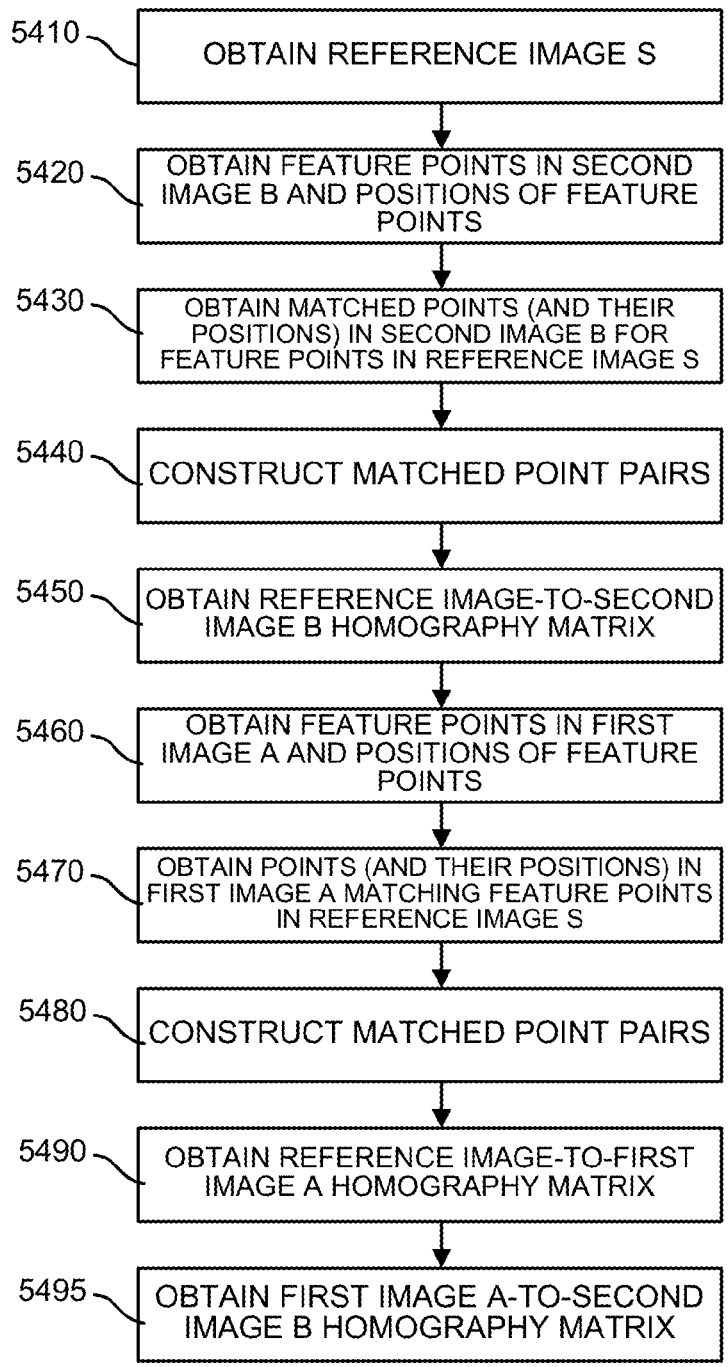
FIG. 5D is a flowchart of an embodiment of a process for obtaining a homography matrix of reference image S-to-second image B and a homography matrix of first image A-to-second image B.
Figure 5E:
FIG. 5E is a diagram of an example of a reference point.

Different methods can be used to obtain the homography matrix of reference image S-to-second image B and the homography matrix of first image A-to-second image B. FIG. 5D is a flowchart of an embodiment of a process for obtaining a homography matrix of reference image S-to-second image B and a homography matrix of first image A-to-second image B. In some embodiments, the process 5400 is an implementation of operation 540 and includes:

In 5410, the server obtains a reference image S, and obtains feature points in the reference image S and positions of the feature points based on a feature point detection algorithm. Examples of the feature point detection algorithm include the FAST (Features from Accelerated Segment Test) or the Harris (Harris Corner Detector) corner detection method. In some embodiments, a plurality of feature points are obtained by the feature point detection algorithm. FIG. 5E is a diagram of an example of a reference point. As an example, the dot of FIG. 5E in the image corresponds to a feature point. The feature point includes data with coordinates (257, 80) and the nine pixels surrounding the feature point (based on gray scale values) are $$\begin{pmatrix} 125 & 94 & 34 \\ 58 & 58 & 63 \\ 156 & 179 & 169 \end{pmatrix}.$$

Referring back to FIG. 5D, in 5420, the server obtains feature points in second image B and positions of the feature points based on a feature point detection algorithm. In some embodiments, the feature points in second image B are obtained in a manner similar to the obtaining of the feature points in the first image A.

Figure 5F:
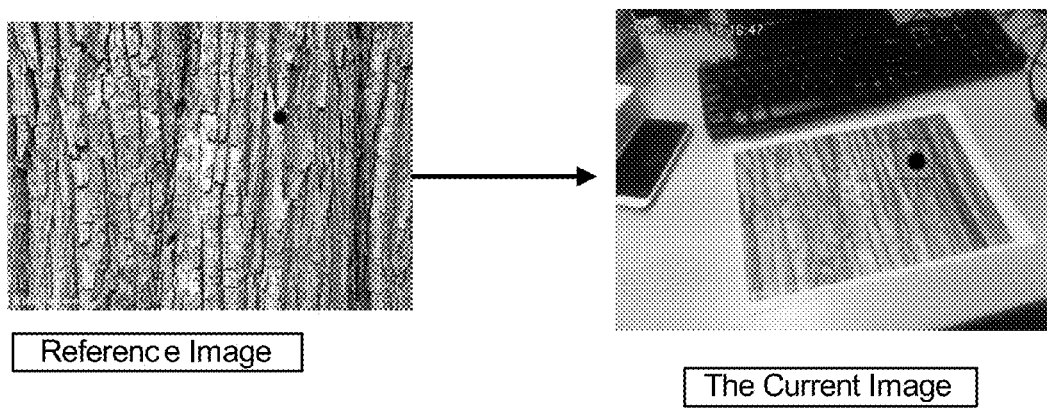
FIG. 5F is a diagram of another example of a reference image and a current image.

In 5430, the server obtains matched points (and their positions) in the second image B for the feature points in the reference image S based on a class 1 feature point matching algorithm. Examples of the class 1 feature point matching algorithm include the SIFT method, the SURF method, and other feature point matching algorithms with similar functions. FIG. 5F is a diagram of another example of a reference image and a current image.

Referring back to FIG. 5D, in 5440, the server constructs matched point pairs based on the feature points in the reference image and the matched points in the second image B. In some embodiments, the server eliminates erroneous matched point pairs from the matched point pairs based on the Prosac algorithm or the Ransac algorithm.

In 5450, the server obtains a homography matrix of reference image-to-second image B based on the matched point pairs.

In 5460, the server obtains feature points in the first image A and positions of the feature points based on a feature point detection algorithm.

In 5470, the server obtains the points (and their positions) in the first image A matching the feature points in the reference image S based on a class 1 feature point matching algorithm.

In 5480, the server constructs matched point pairs based on the feature points in the reference image and the matched points in the first image A. In some embodiments, the server eliminates erroneous matched point pairs from among the matched point pairs based on the Prosac algorithm or the Ransac algorithm.

In 5490, the server obtaining a homography matrix of reference image-to-first image A based on the matched point pairs, the matched point pairs being matched based on the feature points in the reference image and the matched points in the first image A.

In 5495, the server obtains a homography matrix of first image A-to-second image B based on the homography matrix of reference image-to-first image A and the homography matrix of reference image-to-second image B $H_B^A = H_B^S \times (H_A^S)^{-1}$.

Figure 6A:
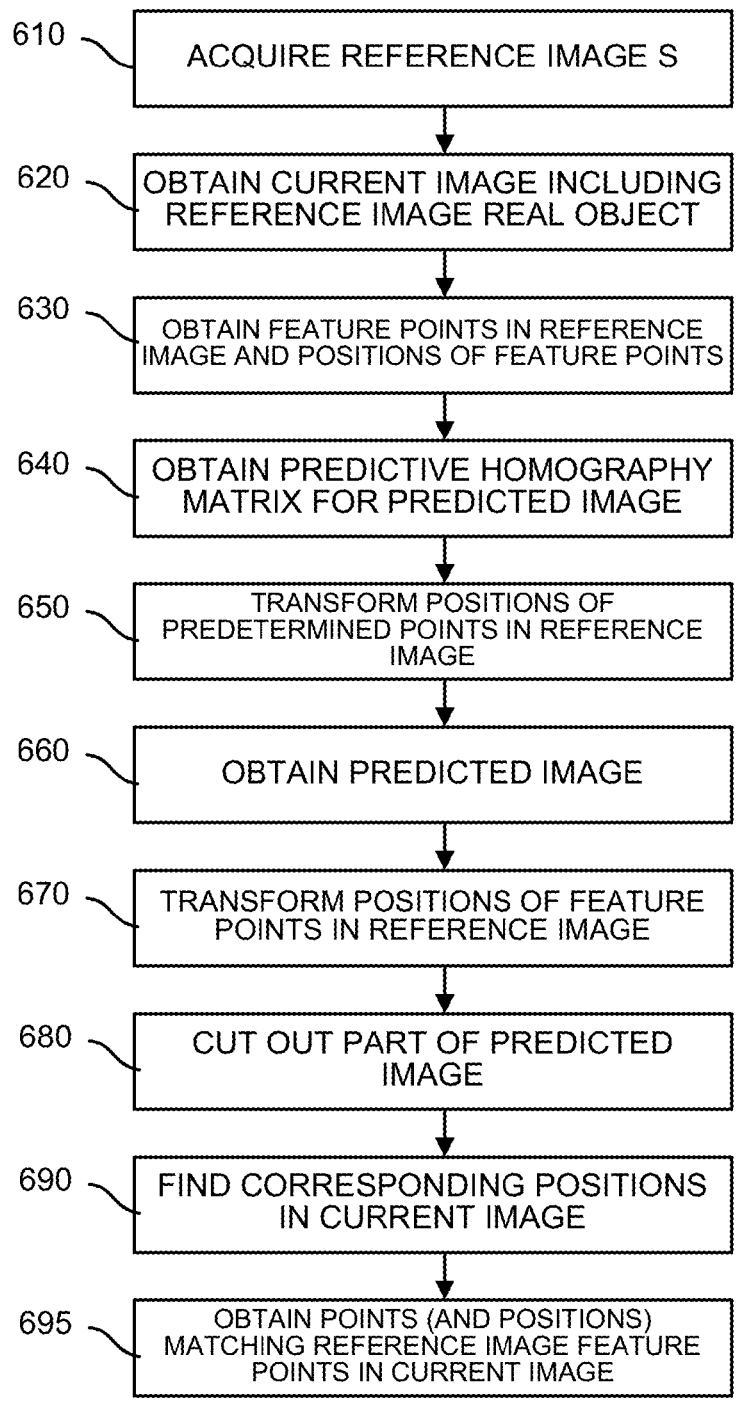
FIG. 6A is a flowchart of an embodiment of a process for obtaining matched points based on a predictive homography matrix.

FIG. 6A is a flowchart of an embodiment of a process for obtaining matched points based on a predictive homography matrix. In some embodiments, the process 600 is performed by a client 920 of FIG. 9 and includes:

As an example, this process describes how to obtain a predictive homography matrix based on a reference image and how to obtain matched points based on the predictive homography matrix.

Figure 6B:
FIG. 6B is a diagram of examples of reference images.
Figure 6B:
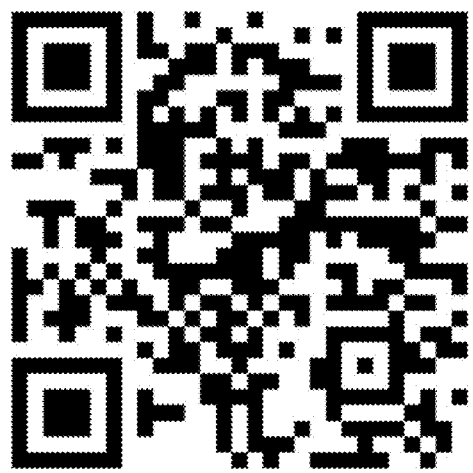

In 610, the server acquires a reference image S. (All reference images refer to this reference image. For convenience, the reference image is marked with the symbol S.) FIG. 6B is a diagram of examples of reference images.

The reference image can be pre-stored in equipment, the reference image can be an image taken by video-capable equipment, or the reference image can be an otherwise acquired image. After the reference image is acquired, size information on the reference image, position information on the reference image, color value information on the reference image, and other such information on selected points in the reference image can be obtained.

Figure 6C:
FIG. 6C is a diagram of an example of a frame.

Referring back to FIG. 6A, in 620, the server obtains a current image including a reference image real object, the current image being captured using video-capable equipment. The reference image real object refers to a reference image that exists in a physical form. Examples of reference image that exists in physical form include a typed reference image or a printed reference image. FIG. 6C is a diagram of an example of a frame. In the event that the reference image corresponds to a photograph taken of a current real object (e.g., a photo of a teapot), the reference image real object can be the current real object indicated by the reference image.

Figure 6D:
FIG. 6D is a diagram of another example of a reference image including a feature point.

Referring back to FIG. 6A, in 630, the server obtains feature points in this reference image and positions of the feature points. In some embodiments, the server obtaining the feature points and the positions of the feature points based on a feature point detection algorithm. The feature point detection algorithm includes FAST, Harris corner detection algorithm, etc. In some embodiments, a plurality of feature points are obtained. For example, 6 feature points are obtained. FIG. 6D is a diagram of another example of a reference image including a feature point. For example, the black dot in the image of FIG. 6D is a feature point, and the feature point has the coordinates (257,80) and is the center point of nine pixels (assuming the nine pixels are of a black and white image).

Referring back to FIG. 6A, in 640, the server obtains a predictive homography matrix for a predicted image based on the reference image. The predicted image corresponds to a forecast image. In some embodiments, the server performs reference image feature point matching point calculations based on the predicted image. The performance of the reference image feature point matching point calculations based on the predicted image reduces computation volume and increases computation speed. In order to obtain the predicted image, first, the server obtains the predictive homography matrix for the predicted image. The server can obtain a predictive homography matrix based on different combinations of hardware operation and rules of computation. In some embodiments, the process 500 of FIG. 5A for obtaining a predictive homography matrix is provided.

In 650, the server transforms positions of predetermined points in the reference image based on the predictive homography matrix, and obtains predicted positions of the reference image predetermined points in the predicted image based on the transformed positions of predetermined points. In some embodiments, the predetermined points are all points in the reference image. In other words, the predicted positions are obtained for all reference image points in the predicted image. In some embodiments, only some feature points and their surrounding pixels are computed; however, all the points can be computed.

Figure 6E:
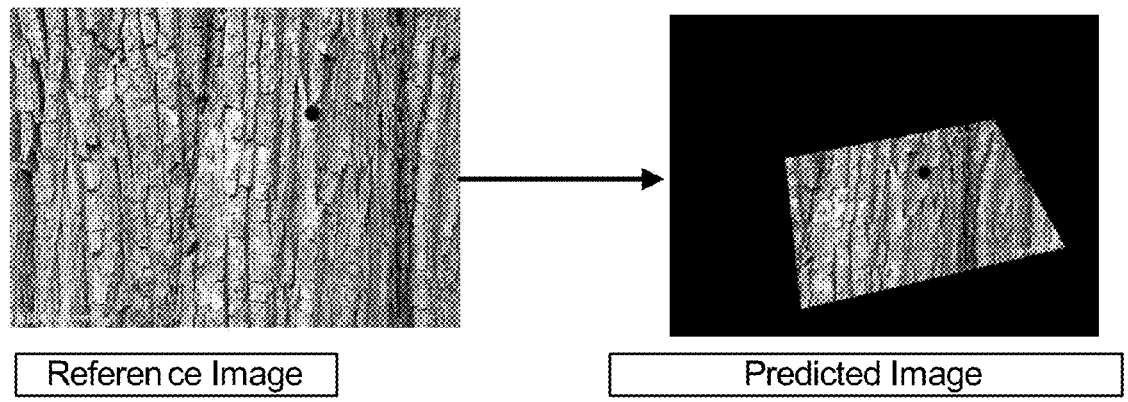
FIG. 6E is a diagram of an example of a reference image, a predicted image, and a current image.
Figure 6E:
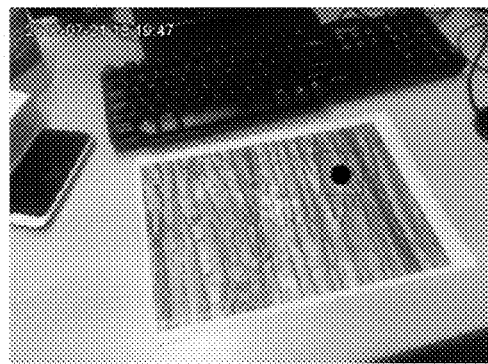

In 660, the server obtains the predicted image based on the predicted positions of the predetermined points and corresponding color values of the predetermined points in the reference image. FIG. 6E is a diagram of an example of a reference image, a predicted image, and a current image.

In the example of FIG. 6E, the predicted image and the current image are very similar to the reference image.

Referring back to FIG. 6A, in 670, the server transforms the positions of the feature points in the reference image based on the predictive homography matrix, and obtains predicted positions of the reference image feature points in the predicted image based on the transformed positions of the feature points. For example, the server transforms the positions of 6 feature points in the reference image, and obtains 6 predicted positions of the 6 feature points in the predicted image.

In 680, the server cuts out a part of the predicted image according to a predetermined size and shape around a predicted position of each feature point in the predicted image, and has the part serve as an image block corresponding to each feature point. For example, 6 predicted positions of reference image feature points exist in the predicted image that has already been obtained. Thus, for each predicted position, the server cuts out 9×9 pixels from the predicted image with the center as the each predicted position. In other words, the server obtains 6 image blocks, each image block corresponding with 9×9 pixels.

In 690, the server finds corresponding positions in the current image based on the predicted positions of the feature points in the predicted image. In some embodiments, the use of the predicted positions aid in finding corresponding positions in the current image faster. For example, 6 predicted positions of 6 feature points in the obtained predicted image exist, and 6 corresponding positions are found in the current image.

In 695, the server obtains points (and their positions) matching the reference image feature points in the current image around each corresponding position in the current image, and within a preset range based on a class 2 feature point matching algorithm which uses the corresponding image block as a standard. The class 2 feature point matching algorithm includes a template matching algorithm, cross correlation algorithm, a normalized cross correlation, or other feature point matching algorithm with a similar function. For example, 6 corresponding positions are found in the current image. For one of these positions, an obtained corresponding 9×9 pixel image block is used within a preset 15×15 pixel range around the position, and the server finds one matched point based on the feature point matching algorithm. In other words, one position and a corresponding matched point are obtained in the current image. The remaining 5 matched points and their 5 positions in the current image are also found in the above manner.

Figure 7A:
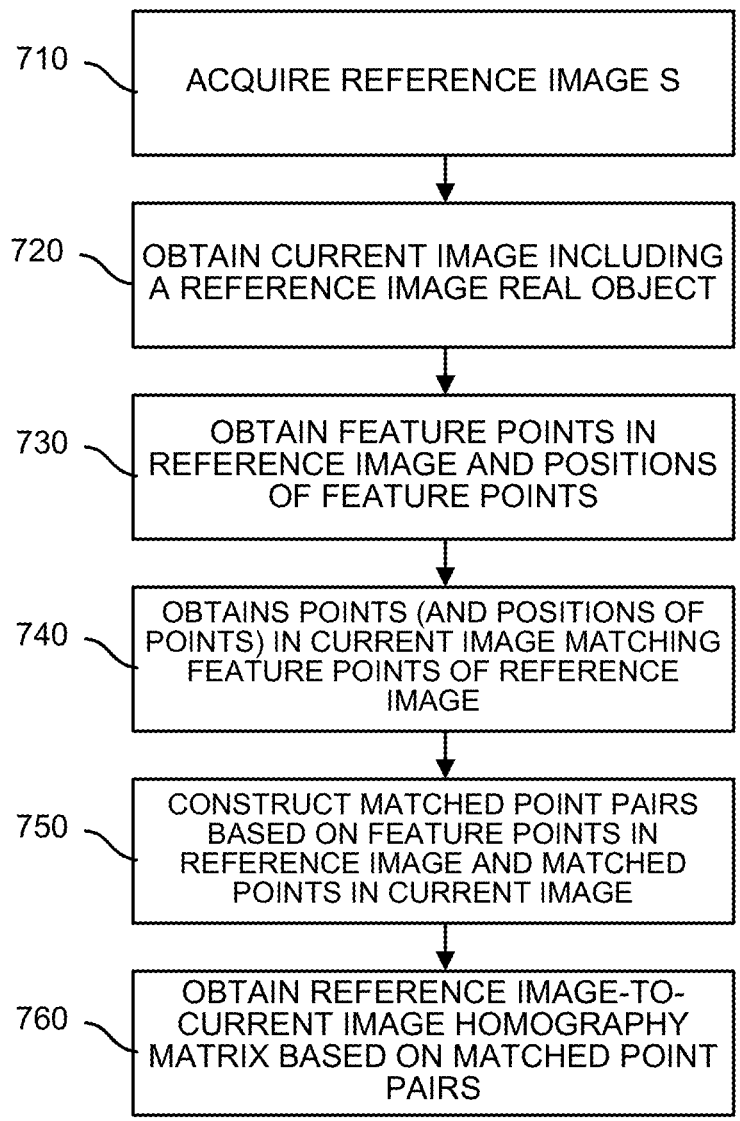
FIG. 7A is a flowchart of another embodiment of a process for obtaining a homography matrix of reference image-to-current image.

FIG. 7A is a flowchart of another embodiment of a process for obtaining a homography matrix of reference image-to-current image. Some of the operations of process 600 may be repeated in process 700 and will not be discussed further for conciseness. In some embodiments, the process 700 is performed by a client 920 of FIG. 9 and includes:

In 710, the server acquires a reference image S. (All reference images in this embodiment are referred to this reference image. For convenience, the reference image is marked with the symbol S.)

In 720, the server obtains a current image including a reference image real object, the current image being captured using video-capable equipment.

In 730, the server obtains feature points in the reference image and positions of the feature points.

In 740, the server obtains points (and positions of the points) in the current image matching the feature points of the reference image. The points in the current image matching the feature points of the reference image can be obtained in various ways. The present embodiment preferably uses the way described by the process 600 of FIG. 6A. The reference image and the current image described in process 600 of FIG. 6A correspond to the reference image and current image, respectively, described in the process 700 of FIG. 7A.

Figure 7B:
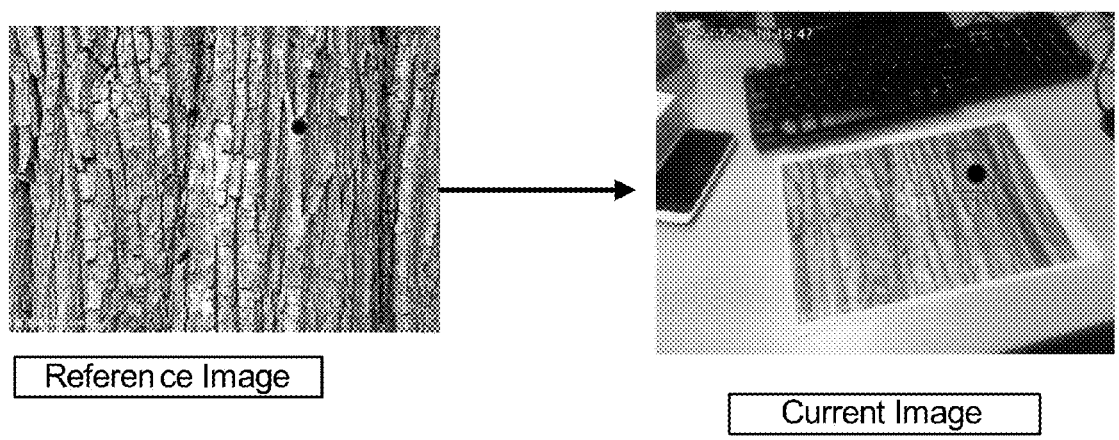
FIG. 7B is a diagram of another example of a reference image and a current image.

In 750, the server constructs matched point pairs based on the feature points in the reference image and the matched points in the current image. In other words, the obtained positions within the reference image of the reference image feature points and the obtained positions in the current image of the current image matched points constitute the matched point pairs. For example, the server obtains 6 feature point positions. The position of one of the feature points in the reference image is (3,9). The server obtains 6 matched point positions in the current image. The position in the current image of the matched point corresponding to the feature point is (2,8). Thus, [(3,9); (2,8)] constitutes one matched point pair. FIG. 7B is a diagram of another example of a reference image and a current image. The remaining 5 matched point pairs are obtained in a similar manner for a total of 6 matched point pairs. In some embodiments, after the above matched point pairs have been obtained, a Prosac or Ransac algorithm is performed to eliminate erroneous point pairs. For example, after the 6 matched point pairs have been obtained, the server eliminates an erroneous matched point pair based on the Prosac algorithm or the Ransac algorithm. Accordingly, 5 matched point pairs remain.

Referring back to FIG. 7A, in 760, the server obtains a homography matrix of reference image-to-current image based on the matched point pairs. In some embodiments, the server calculates the homography matrix of reference image-to-current image based on a singular value decomposition algorithm, LM iterative algorithm, or a Gauss-Newton algorithm. For example, the homography matrix of reference image-to-current image is calculated based on the remaining 5 matched point pairs and the singular value decomposition algorithm.

Figure 8:
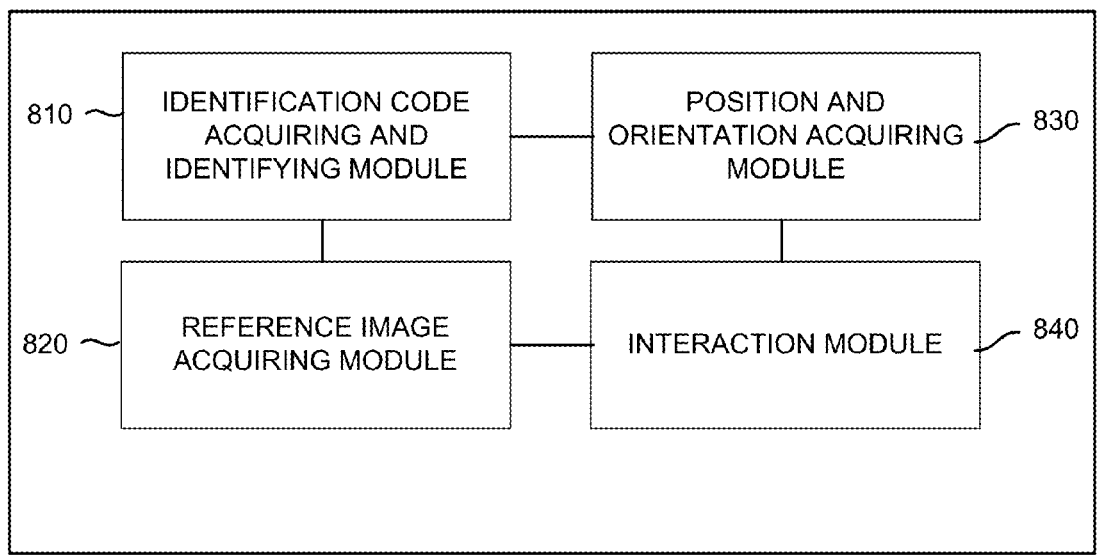
FIG. 8 is a structural block diagram of an embodiment of an identification code-based three-dimensional interactive system.

FIG. 8 is a structural block diagram of an embodiment of an identification code-based three-dimensional interactive system. In some embodiments, the system 800 performs the process 100 and includes an identification code acquiring and identifying module 810, a reference image acquiring module 820, a position and orientation acquiring module 830, and an interaction module 840.

The identification code acquiring and identifying module 810 obtains images containing identification-coded real objects, the images being taken by video-capable equipment and identifies object information corresponding to identification codes from the identification-coded real objects.

The reference image acquiring module 820 acquires reference images associated with the identification codes and feature points of the reference images.

The position and orientation acquiring module 830 obtains positions and/or orientations on the video capable equipment relative to the identification-coded real objects based on the reference images and the feature points of the reference images.

The interaction module 840 conducts three-dimensional interactions based on the positions and/or orientations of the video-capable equipment relative to the identification-coded real objects and the object information corresponding to the identification codes.

In some embodiments, the interaction module 840 is further configured to: acquire three-dimensional images of the identification-coded real objects based on the object information, add the three-dimensional images one-by-one onto the identification codes in current images taken by the video-capable equipment or onto the object positions where the identification codes are located. For example, a 2D barcode exists on a package of a product, the 2D barcode only occupies a small area of the package. On a display, the display can add 3D images to the 2D barcode image, or add to the package area of the 2D barcode. In other example, 3D animation can be added based on a computed position and orientation.

In some embodiments, the interaction module 840 is further configured to: acquire relative motion speed, acceleration or both of the video-capable equipment and the identification code or real object where the identification code is located based on the images of identification-coded real objects taken with continuous-frame, video-capable equipment, continuously acquire the positions and orientations of the video-capable equipment relative to the identification-coded real object, and convey in a predetermined manner the motion speed, acceleration or both to a user interface.

In some embodiments, the reference image acquiring module 820 is further configured to: acquire an initial image including an identification-coded real object from an image, the image being captured using the video-capable equipment, obtain a reference image based on the initial image, and obtain feature points and positions of the feature points in the reference image based on a feature point detection algorithm.

In some embodiments, the position and orientation acquiring module 830 is further configured to: obtain a current image including an identification-coded real object, the current image being taken with video-capable equipment, acquire a homography matrix of reference image-to-current image based on the reference image and the current image, and obtain position and/or orientation information on the video-capable equipment relative to the identification-coded real objects based on the homography matrix.

Figure 9:
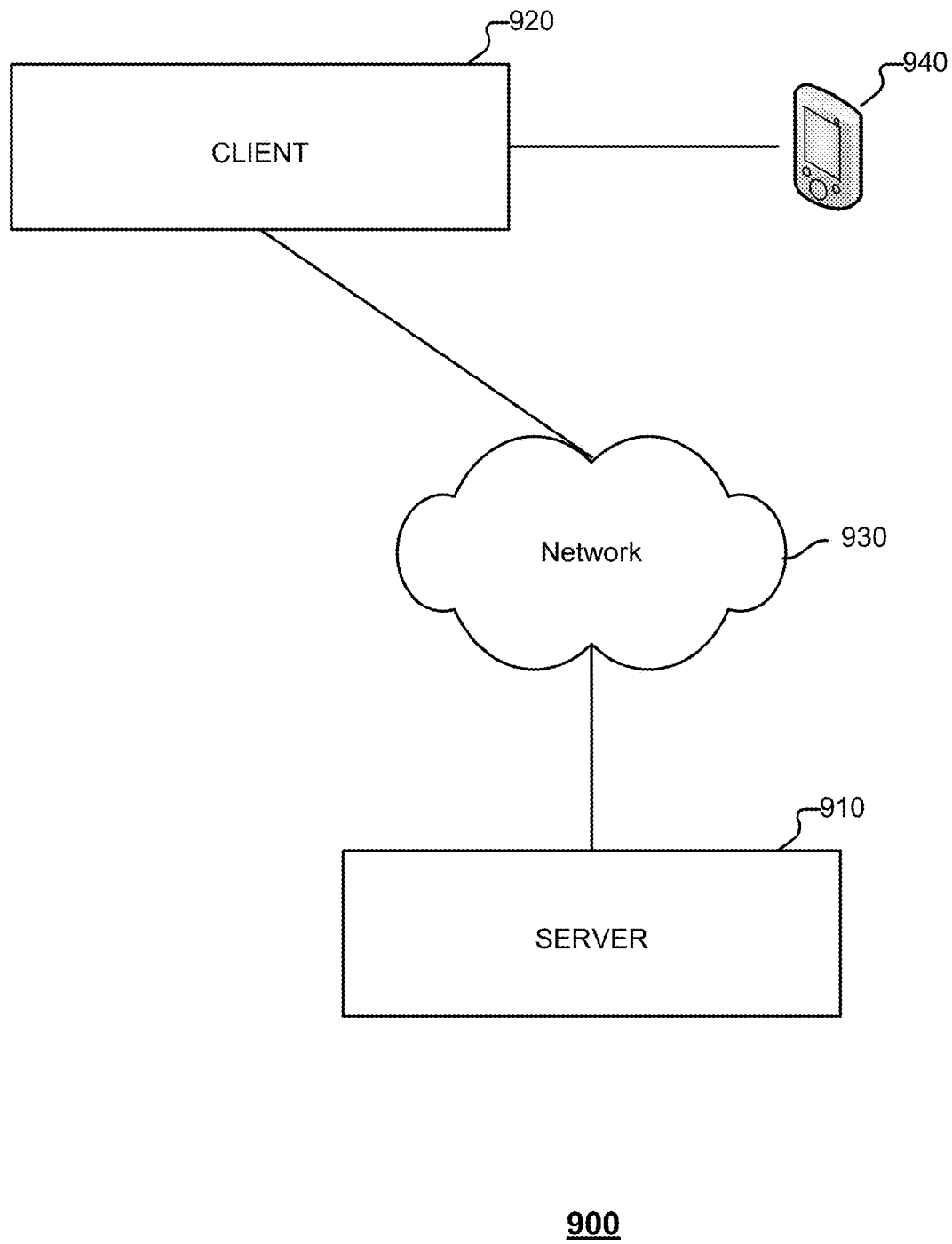
FIG. 9 is a structural diagram illustrating an embodiment of an identification code-based three-dimensional interactive system.

FIG. 9 is a structural diagram illustrating an embodiment of an identification code-based three-dimensional interactive system. In some embodiments, the system 900 includes a server 910 connected to a client 920 via a network 930.

In some embodiments, an image is taken using video-capable equipment 940 and the client 920 sends the image including an identification-coded real object to the server 910 to conduct three-dimensional interactions.

In some embodiments, the obtaining of the homography matrix of reference image-to-current image based on the reference image and the current image includes obtaining positions of the 4 vertices of the identification code in the initial image, constructing matched point pairs based on the 4 vertices of the reference image and the 4 vertices of the identification code in the initial image, and obtaining a homography matrix for reference image-to-current image transformation based on the matched point pairs.

In some embodiments, the obtaining of the homography matrix of reference image-to-current image based on the reference image and the current image includes obtaining points in the current image matching the feature points of the reference image based on a feature point matching algorithm, constructing matched point pairs based on the feature points in the reference image and the matched points in the current image, and obtaining a homography matrix of reference image-to-current image based on the matched point pairs.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An identification code-based three-dimensional interactive method, comprising:
    acquiring an image including an identification-coded real object, the image being taken by video-capable equipment;
    identifying an identification code from the identification-coded real object;
    obtaining object information corresponding to the identification code;
    acquiring a reference image associated with the identification code and feature points of the reference image;
    obtaining a position, an orientation, or a combination thereof on the video-capable equipment relative to the identification-coded real object based on the reference image and the feature points of the reference image; and
    conducting three-dimensional interactions based on the position, the orientation, or a combination thereof of the video-capable equipment relative to the identification-coded real object and the object information corresponding to the identification code.

2. The method as described in claim 1, wherein the object information includes basic information obtained based on the identifying of the identification code, the basic information including object ID.

3. The method as described in claim 2, wherein the object information includes target data obtained based on the basic information obtained through local databases or networks and then used for the three-dimensional interaction, the target data including a three-dimensional image corresponding to the object information.

4. The method as described in claim 1, wherein the conducting of the three-dimensional interaction comprises:
    acquiring a three-dimensional image of the identification-coded real object based on the object information; and
    adding the three-dimensional image one-by-one onto the identification code in a current image taken by the video-capable equipment or onto the object position where the identification code is located.

5. The method as described in claim 1, wherein the conducting of the three-dimensional interactions comprises:
    continuously obtaining the position and orientation of the video-capable equipment relative to the identification-coded real object;
    obtaining a relative motion speed, an acceleration, or a combination thereof of the video-capable equipment and the identification code or real object where the identification code is located; and conveying in a predetermined manner the motion speed, the acceleration, or a combination thereof to a user interface.

6. The method as described in claim 1, wherein the acquiring of the reference image associated with the identification code and feature points of the reference image includes:
obtaining the reference image based on an initial image containing identification-coded real object; and
obtaining the feature points in the reference image and positions of the feature points based on a feature point detection algorithm.

7. The device as described in claim 6, wherein the obtaining of the reference image based on the initial image comprises:
regarding the initial image as the reference image; or
generating a standard identification code from the object information based on an identification code generating algorithm and regarding the standard identification code as the reference image.

8. The method as described in claim 6, wherein the obtaining of the position, the orientation, or a combination thereof of the video-capable equipment relative to the identification-coded real object comprises:
obtaining current image containing the identification-coded real object, the current image being taken by the video-capable equipment;
acquiring a homography matrix of reference image-to-current image based on the reference image and the current image; and
obtaining the position, the orientation, or a combination thereof of the video-capable equipment relative to the identification-coded real object based on the homography matrix.

9. The method as described in claim 8, wherein the acquiring of the homography matrix of reference image-to-current image based on the reference image and the current image comprises:
obtaining positions of 4 identification code vertices in the initial image;
constructing matched point pairs based on 4 vertices of the reference image and the 4 identification code vertices in the initial image; and
obtaining the homography matrix for converting the reference image to a current image based on the matched point pairs.

10. The method as described in claim 8, wherein the acquiring of the homography matrix of reference image-to-current image based on the reference image and the current image comprises:
obtaining points in the current image matching the feature points in the reference image based on a feature point matching algorithm;
constructing matched point pairs based on the feature points in the reference image and the matched points in the current image; and
obtaining the homography matrix of reference image-to-current image based on the matched point pairs.

11. The method as described in claim 10, wherein the obtaining of the points in the current image matching the feature points in the reference image comprises:
obtaining a predicted image based on an image obtained prior to the current image and that is used to predicted the current image, the predicted image being an image that is obtained through calculations using a predetermined algorithm;
obtaining predicted positions of the reference image feature points in the predicted image;
finding corresponding predetermined positions in the current image to the predicted positions based on the predicted positions of the reference image feature points in the predicted image;
cutting out a part of the predicted image according to a predetermined size and shape around a predicted position of each reference image feature point in the predicted image, the part serving as a predetermined image block corresponding to each feature point; and
obtaining points in the current image matching the feature points of the reference image based on around each predetermined position in the current image, and within a preset scope, wherein the obtaining of the points in the current image matching the feature points of the reference image is based on a class 2 feature point matching algorithm which uses the predetermined image block as a standard.

12. The method as described in claim 11, wherein the obtaining of the predicted positions of the reference image feature points in the predicted image comprise:
obtaining a first image A containing an identification-coded real object, the first image A being taken by video-capable equipment, the first image A being captured prior to the current image;
acquiring a second image B containing an identification-coded real object, the second image B being taken by the video-capable equipment, the second image B being captured prior to the current image;
obtaining a homography matrix of reference image-to-second image B and a homography matrix of first image A-to-second image B based on the reference image, first image A, and the second image B;
calculating a predictive homography matrix for the predicted image based on the homography matrix of first image A-to-second image B and the homography matrix of reference image-to-second image B;
transforming the reference image based on the predictive homography matrix to obtain the predicted image;
transforming the positions of the feature points in the reference image based on the predictive homography matrix, and
obtaining the predicted positions of the reference image feature points in the predicted image.

13. The method as described in claim 12, wherein:
the second image B is an image of a previous frame of the current image; and
the first image A is an image of two frames before the current image.

14. The method of claim 6, wherein the obtaining of the feature points in the reference image and positions of the feature points based on a feature point detection algorithm includes:
selecting, as at least one of the obtained feature points, feature points that correspond to points other than a vertex position of a standard identification code.

15. The method of claim 1, wherein the obtaining of the position, the orientation, or the combination thereof on the video-capable equipment relative to the identification-coded real object includes obtaining the position, the orientation, or the combination thereof on the video-capable equipment relative to the identification-coded real object in relation to a three-dimensional space.

16. An identification code-based three-dimensional interactive system, comprising:
at least one processor configured to:

acquire an image including an identification-coded real object, the image being taken by video-capable equipment;

identify an identification code from the identification-coded real object;

obtain object information corresponding to the identification code;

acquire an reference image associated with the identification code and feature points of the reference image;

obtain a position, an orientation, or a combination thereof on the video-capable equipment relative to the identification-coded real object based on the reference image and the feature points of the reference image; and conduct a three-dimensional interaction based on the position, the orientation, or a combination thereof of the video-capable equipment relative to the identification-coded real object and the object information corresponding to the identification code; and a memory coupled to the at least one processor and configured to provide the at least one processor with instructions.

17. The system as described in claim 16, wherein the conducting of the three-dimensional interaction comprises:

acquire a three-dimensional image of the identification-coded real object based on the object information; and add the three-dimensional image one-by-one onto the identification code in a current image taken by the video-capable equipment or onto the object position where the identification code is located.

18. The system as described in claim 16, wherein the conducting of the three-dimensional interaction comprises:

continuously obtain the position and orientation of the video-capable equipment relative to the identification-coded real object;

obtain a relative motion speed, acceleration, or a combination thereof of the video-capable equipment and the identification code or real object where the identification code is located; and convey in a predetermined manner the motion speed, acceleration, or a combination thereof to a user interface.

19. The system as described in claim 16, wherein the acquiring of the reference image associated with the identification code and feature points of the reference image includes:

obtain the reference image based on the initial image containing identification-coded real object; and obtain the feature points in the reference image and positions of the feature points based on a feature point detection algorithm.

20. The system as described in claim 19, wherein the obtaining of the position, the orientation, or a combination thereof on the video-capable equipment relative to the identification-coded real object comprises:

obtain a current image containing the identification-coded real object, the current image being taken by the video-capable equipment;

acquire a homography matrix of reference image-to-current image based on the reference image and the current image; and obtain the position, the orientation, or a combination thereof on the video-capable equipment relative to the identification-coded real object based on the homography matrix.

21. The system as described in claim 20, wherein the acquiring of the homography matrix of reference image-to-current image based on the reference image and the current image comprises:

obtain positions of 4 identification code vertices in the initial image;

construct matched point pairs based on 4 vertices of the reference image and the 4 identification code vertices in the initial image; and obtain a homography matrix for converting the reference image to a current image based on the matched point pairs.

22. The system as described in claim 20, wherein the acquiring of the homography matrix of reference image-to-current image based on the reference image and the current image comprises:

obtain points in the current image matching the feature points in the reference image based on a feature point matching algorithm;

construct matched point pairs based on the feature points in the reference image and the matched points in the current image; and obtain a homography matrix of reference image-to-current image based on the matched point pairs.

23. A predictive homography matrix method for obtaining a predictive image based on reference image, comprising:

acquiring a reference image S;

obtaining a first image A containing a first reference image real object, the first image A being taken using video-capable equipment;

obtaining a second image B containing a second reference image real object, the second image B being taken using video-capable equipment;

obtaining a homography matrix of reference image S-to-second image B and a homography matrix of first image A-to-second image B based on the reference image S, the first image A, and the second image B; and calculating a predictive homography matrix used to calculate a predicted image based on the homography matrix of reference image S-to-second image B and the homography matrix of first image A-to-second image B.

24. The method as described in claim 23, wherein the obtaining of the homography matrix of reference image S-to-second image B comprises:

obtaining feature points in the reference image S and positions of the feature points based on a feature point detection algorithm;

obtaining feature points and positions of the feature points in the second image B based on the feature point detection algorithm;

obtaining points (and their positions) in the second image B matching the feature points in the reference image S based on the feature point matching algorithm;

constructing matched point pairs based on the feature points of the reference image and the matched points in the second image B; and acquiring a homography matrix of reference image-to-second image based on the matched point pairs.

25. The method as described in claim 24, further comprising:

eliminating erroneous matched pairs in the matched point pairs constructed based on the feature points of the reference image and the matched points in the second image B, the eliminating of the erroneous matched pairs being based on a Prosac algorithm or a Ransac algorithm; and obtaining a homography matrix of reference image-to-second image B based on matched pairs that were not eliminated by the eliminating operation.

26. The method as described in claim 23, wherein the obtaining of the homography matrix of first image A-to-second image B comprises:
obtaining the feature points and the positions of the feature points in the reference image S based on the feature point detection algorithm;
obtaining feature points and positions of the feature points in the first image A based on the feature point detection algorithm;
obtaining points (and their positions) in the first image A matching the feature points in the reference image S based on the feature point matching algorithm;
constructing matched point pairs based on the feature points of the reference image and the matched points in the first image A;
obtaining a homography matrix of reference image-to-first image A based on the matched point pairs; and
obtaining a homography matrix of first image A-to-second image B based on the homography matrix of reference image-to-first image A and the homography matrix of reference image S-to-second image B.

27. The method as described in claim 26, further comprising
eliminating erroneous matched pairs in the matched point pairs constructed based on the feature points of the reference image and the matched points in the first image A, the eliminating of the erroneous matched pairs is based on a Prosac algorithm or a Ransac algorithm; and
obtaining a homography matrix of reference image-to-first image A based on matched pairs that were not eliminated by the eliminating operation.

28. An identification code-based three-dimensional interactive computer program product, the computer program product being embodied in a tangible non-transitory computer readable storage medium and comprising computer instructions for:
acquiring an image including an identification-coded real object, the image being taken by video-capable equipment;
identifying an identification code from the identification-coded real object;
obtaining object information corresponding to the identification code;
acquiring a reference image associated with the identification code and feature points of the reference image;
obtaining a position, an orientation, or a combination thereof on the video-capable equipment relative to the identification-coded real object based on the reference image and the feature points of the reference image; and
conducting a three-dimensional interaction based on the position, the orientation, or a combination thereof of the video-capable equipment relative to the identification-coded real object and the object information corresponding to the identification code.

* * * * *

UNITED STATES PATENT AND TRADEMARK OFFICE
CERTIFICATE OF CORRECTION

PATENT NO.        : 9,195,871 B2
APPLICATION NO.   : 14/172654
DATED             : November 24, 2015
INVENTOR(S)       : Zhou et al.

Page 1 of 1

It is certified that error appears in the above-identified patent and that said Letters Patent is hereby corrected as shown below:

On the title page, item 56

In Page 2, Other Publications, Citation 4, delete "David Kriegman."Nomography Estimation." Lecture Computer Vision I, CSE A 252 (2007)." and insert --"David Kriegman. "Homography Estimation." Lecture Computer Vision I, CSE A 252 (2007).-- therefor.

Signed and Sealed this
Twenty-eighth Day of June, 2016

Michelle K. Lee
*Director of the United States Patent and Trademark Office*